Figure 13:
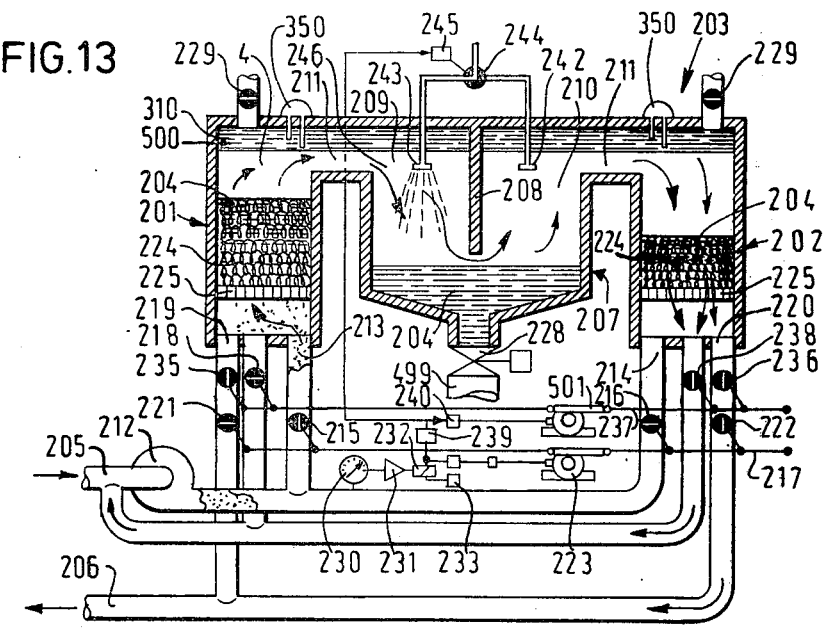

# United States Patent [19]

Middelbeek et al.

[11] 4,145,280
[45] Mar. 20, 1979

[54] METHOD AND DEVICE FOR SEPARATING A MIXTURE

[75] Inventors: Cornelis G. Middelbeek, Nootdorp; Machiel E. Polano; Tjako A. Wolters, both of Zeist, all of Netherlands

[73] Assignees: Ballast-Nedam Groep N.V., Amstelveen; Skimovex B.V., The Hague, both of Netherlands

[21] Appl. No.: 842,241

[22] Filed: Oct. 14, 1977

[30] Foreign Application Priority Data

Oct. 14, 1976 [NL] Netherlands ............ 7611378
Feb. 4, 1977 [NL] Netherlands ............ 7701232
Feb. 4, 1977 [NL] Netherlands ............ 7701233

[51] Int. Cl.² ............ B01D 15/04; B01D 21/10; B01D 29/08; B01D 47/06
[52] U.S. Cl. ............ 210/20; 210/23 R; 210/27; 210/51; 210/80; 210/82; 210/108; 210/196; 210/259; 210/265; 210/277; 210/300; 55/84; 55/258; 55/302
[58] Field of Search ............ 210/DIG. 5, 23, 20, 210/23 R, 27, 82, 108, 261, 264, 275, 277, 300, 51, 79, 80, 90, 196, 252, 259, 265; 55/84, 95, 96, 223, 244, 258, 259, 302, 350

[56] References Cited

U.S. PATENT DOCUMENTS

| | | | |
|---|---|---|---|
| 477,281 | 6/1892 | Thomassen | 210/300 |
| 537,705 | 4/1895 | McCabe | 210/275 |
| 651,173 | 6/1900 | Weaver | 210/264 |
| 1,194,646 | 8/1916 | Linden | 210/82 |
| 3,794,583 | 2/1974 | Rhodes | 210/DIG. 5 |
| 4,001,113 | 1/1977 | Schoenrock et al. | 210/33 |
| 4,052,300 | 10/1977 | Mosso | 210/20 |
| 4,059,511 | 11/1977 | Mushu et al. | 210/23 R |
| 4,073,729 | 2/1978 | Kraemer et al. | 210/80 |

FOREIGN PATENT DOCUMENTS

| | | | |
|---|---|---|---|
| 756735 | 9/1956 | United Kingdom | 210/275 |
| 1055761 | 1/1967 | United Kingdom | 210/82 |
| 1298667 | 4/1972 | United Kingdom | 210/DIG. 5 |
| 536830 | 11/1976 | U.S.S.R. | 210/264 |

*Primary Examiner*—Charles N. Hart
*Assistant Examiner*—David R. Sadowski
*Attorney, Agent, or Firm*—John P. Snyder

[57] ABSTRACT

Method of separating a mixture of a carrier medium and at least one substance insoluble therein, for example, water and oil or gas and soot, in which the mixture is separated in three steps, i.e. a first step in which the mixture is passed for coalescence of the substance through a first packet of moving filter material, a second step in which the substance coalesced segregates from the mixture by gravity and a third step in which the remainder of the substance and the other packet of filter material is filtered out.

23 Claims, 26 Drawing Figures

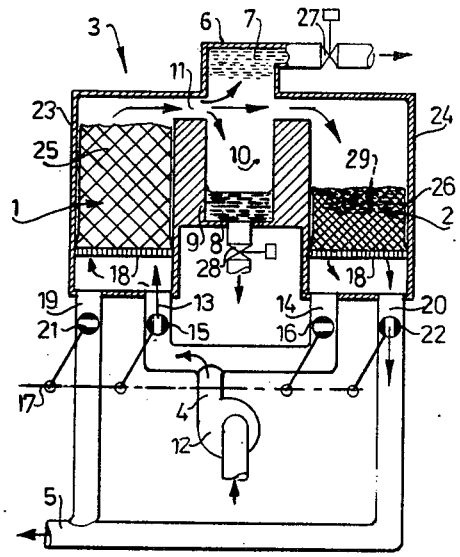
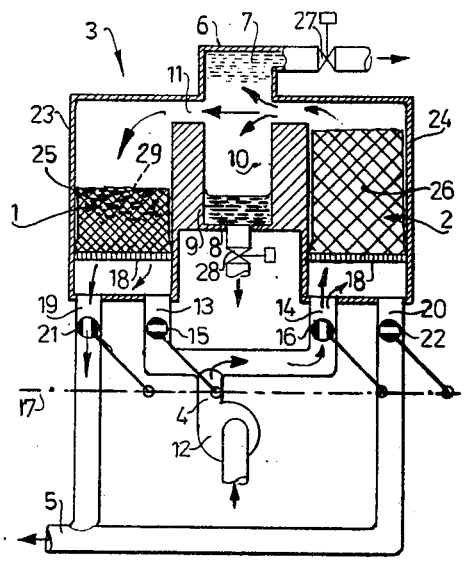
FIG.1 FIG.2
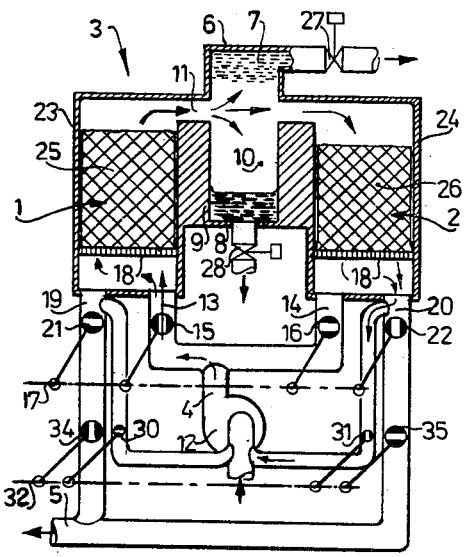
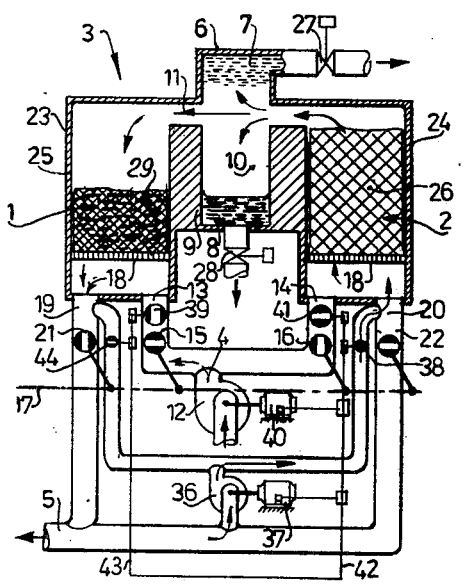
FIG.3 FIG.4

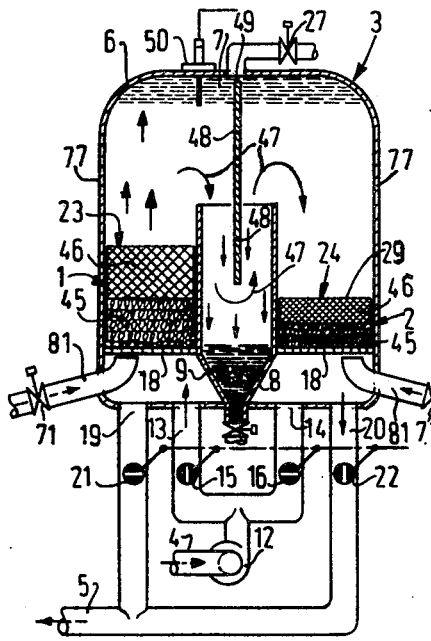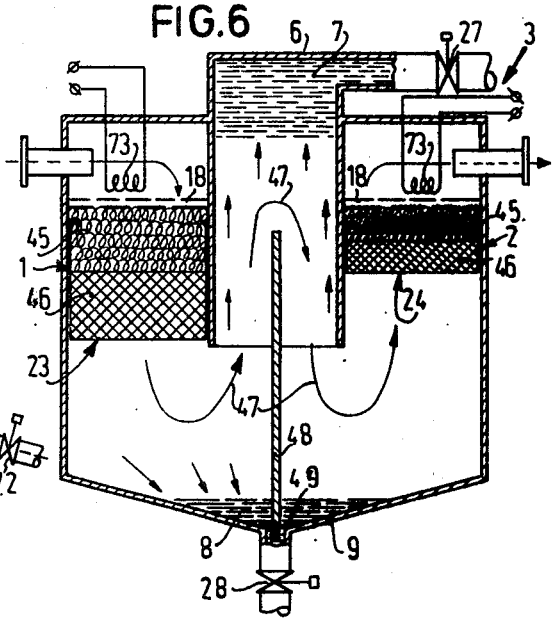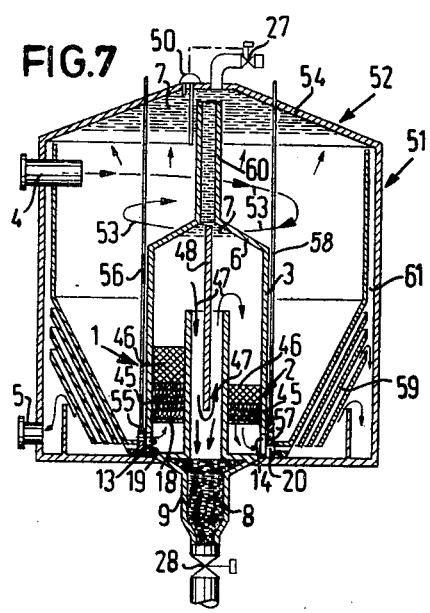

METHOD AND DEVICE FOR SEPARATING A MIXTURE

The invention relates to a method of separating a mixture of a carrier medium and at least one substance insoluble therein, for example, water and oil or gas and soot, in which a stream of mixture for being filtered is passed through a packet of compact filter material, after which the substance retained in the filter material is removed therefrom by passing the mixture through said packet of filter material, so that this filter material is brought into a moving state, said mixture together with the substance removed from the filter material being conducted along a collecting space and across a compact packet of filter material.

Such a method is known from British Pat. No. 1,445,692. Herein, whilst the mixture is freed of the substance in a filtering packet of filter material, a further packet of filter material is flushed with a flashing liquid consisting, for example, of the mixture, which is conducted away together with the substance emanating from said packet of filter material. This flushing liquid contaminated by the substance is purified in a separator comprising a collecting space and may be added afterwates to the stream of mixture to be purified.

The invention has for its object to separate a mixture in a simple manner, so that by means of the available packets of filter material a large quantity of mixture per unit time can be separated for a long time. For this purpose a stream of mixture to be separated is dissociated in three steps i.e., a first step in which the stream of mixture is passed for coalescence or coagulation of the substance through a packet of moving filter material, a second step in which the stream of mixture is passed along the collecting space and the substance coalesced or coagulated in the first step segregates from the mixture by gravity, and a third step in which the stream of mixture treated in the preceding steps is passed through a further packet of compact filter material filtering out substantially the remainder of the substances, said packets of filtering material being alternately used for treating the stream of mixture in the first and the third steps. In this method, in fact, the whole stream of mixture from which the substance has to be extracted is pretreated in the first step, since it has been found that an important portion of the substance contained in the mixture coalesces or coagulates owing to the motions of the filter material. This coalesced and/or coagulated substance can be readily separated out and arrives at the collecting space during the second step. Moreover, the stream of mixture will regenerate the packet of soiled filter material. It could be expected that in this way the substance would be extracted from this stream of mixture only with greater difficulty, but it has been found that the substance collected in the third step in the packet of filter material coalesces therein so that during regeneration of the same filter the stream of mixture carries along from this filter element the substance substantially coalesced into large drops and/or flocks, which readily separate out by gravity in the collecting space.

The invention furthermore provides a device specifically intended to separate a mixture by carrying out the method according to the invention, said device comprising at least one first filter element having a packet of filter material, a mixture feeder, a carrier medium outlet and at least one collecting space for the substance. This device has the feature, that the first and the second filter elements communicate with one another through a conduit passing along the collecting space, in that the mixture feeder can be alternately connected through commutating means with the inlet of the first and with that of the second filter element treating the stream of mixture in a first step with moving filter material and in that the carrier medium outlet can be alternately connected through commutatable connecting means with the outlet of the first and with that of the second filter element treating the stream of mixture in the third step with compacted filter material.

Figure 16:
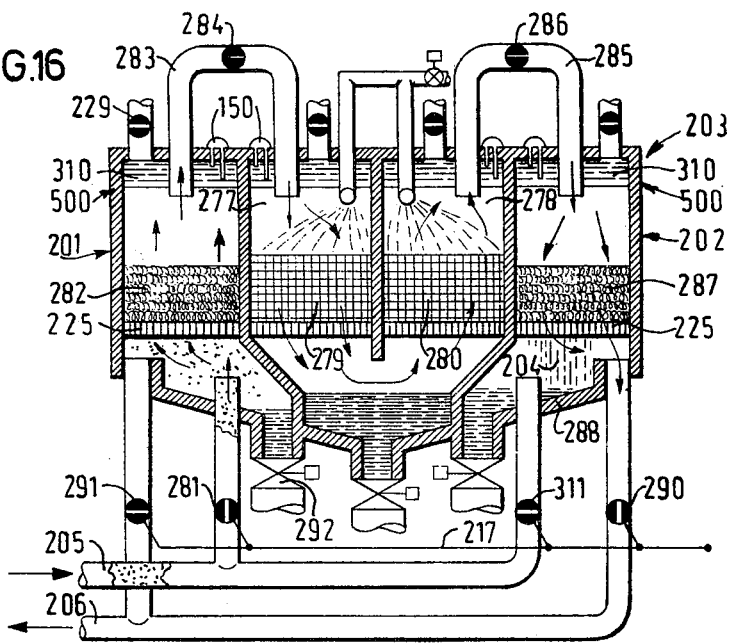
Figure 17:
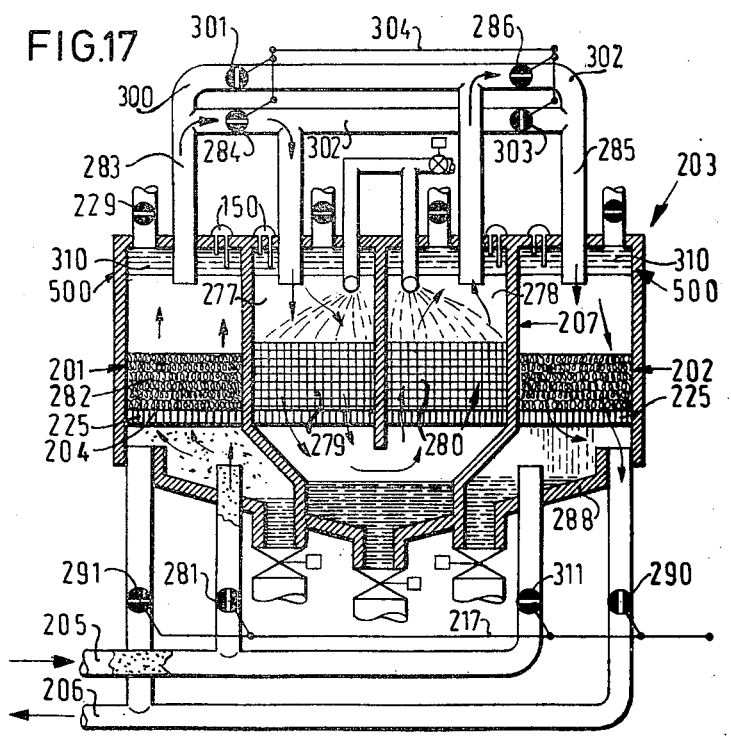
Figure 18:
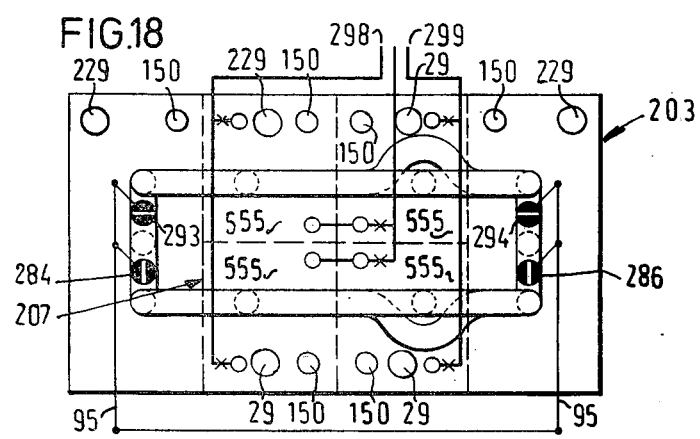
Figure 23:
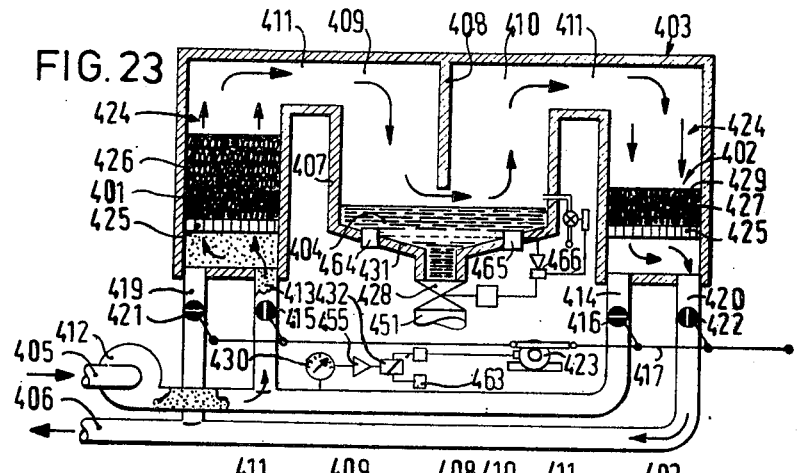
Figure 24:
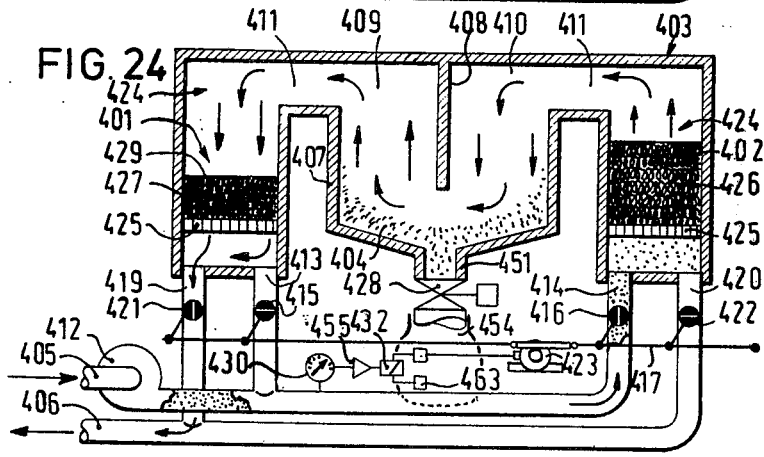

The aforesaid and further features of the invention will be described more fully with reference to the drawing, in which there show schematically:

FIGS. 1 and 2 a vertical sectional view of a device in accordance with the invention during the execution of the method embodying the invention in two different phases, FIGS. 3, 4, 5, 6, 7, 8, 10, 13, 14, 15, 16, 17, 19, 20, 21, 23, 25 and 26 each a vertical sectional view of further variants of the device shown in FIGS. 1 and 2, FIG. 9 a plan view of the device shown in FIG. 8, FIG. 11 a plan view of the device shown in FIG. 10, FIG. 12 a side elevation of the device of FIG. 10, FIG. 18 a plan view of the device shown in FIG. 17, FIG. 22 a plan view of the device shown in FIG. 21, and FIG. 24 the device of FIG. 23 subsequent to a phase change.

The device 3 shown in FIGS. 1 and 2 for separating a carrier medium, for example, water with a lightweight substance 7 such as light oil and a heavy substance 8 such as heavy oil, comprises a first filter element 1 and a second filter element 2, a mixture feeder 4, a carrier medium outlet 5, a collecting space 6 for the light substance 7 and a collecting space 9 for the heavy substance 8, said collecting spaces 6 and 9 forming part of a reservoir 10. The filter elements 1 and 2 communicate with one another through a conduit 11 including the reservoir 10. The mixture feeder 4 communicating with a pump 12 can be alternately connected with the inlets 13 or 14 of the filter elements 1 and 2 respectively through commutable connecting elements formed by shut-off members 15 and 16 actuated by a common control-rod 17. The carrier medium outlet 5 can be connected with the outlets 20 and 19 of the filter elements 2 and 1 respectively through commutable connecting elements formed by shut-off members 22 and 21 respectively, which can also be actuated simultaneously by the control-rod 17. The filter elements 1 and 2 comprise each a holder 23, 24 filled with packets of filter material 25, 26 supported by a grating 18. The collecting spaces 6 and 9 are provided with a shut-off member 27 and 28 respectively.

The dissociation of the stream of mixture supplied through the mixture feeder 4 is performed by carrying out the method embodying the invention in the device 3 in three steps, i.e., a first step in which the stream of mixture is passed for coalescence and coagulation respectively of substances 7 and 8 through a packet of moving filter material 25 (FIG. 1), a second step in which the stream of mixture is passed along the collecting spaces 6 and 9 and the substance 7, 8 coalesced or coagulated in the first step is segregated from the mixture by gravity and a third step in which the stream of mixture treated in the preceding steps is passed through a compact further packet of filter material 26 (FIG. 1)

filtering off substantially the remainder of the substances 7 and 8, said packets of filter material 25, 26 (FIGS. 1 and 2) being alternately employed for treating the stream of mixture in the first and the third steps. FIG. 1 shows the filter material of the filter element 1 in a state of motion, whereas the filter material 26 of the filter element 2 is compacted owing to the flow of the mixture in the direction indicated by arrows in FIG. 1, the reversal of the direction of flow being performed by means of the control-rod 17. FIG. 1 shows that the mixture flows through the pump 12, the opened shut-off member 15, the inlet 13 and the grating 18 upwards across the packet of filter material 25, which may consist of fibres or grains, which are thus loosened from one another and form an ample passage for the mixture together with the substances 7 and 8 absorbed in the filter material. Moreover, the intense motions of the fibres or grains provide a high probability of collision for the particles of the substances, which furthers the coalescence or coagulation thereof. The filter element 1 is then in the coalescent phase. This filter element 1 is, in addition, in a flushing phase because the stream of mixture also flushes the filter material 25 of the filter element 1 and thus disengages and carries along the substances 7, 8 previously collected in said filter material 25. The mixture laden with said additional substances 7 and 8 flows through the conduit 11 and the reservoir 10 and hence along the collecting spaces 6 and 9 towards the second filter element 2. During the second step the large flocks and/or drops of the substances 7 and 8 segregate in the reservoir 10 by gravity, whereas the small particles of said substances are caught along by the carrier medium towards the filter element 2. During the third step the stream of mixture passes through the filter element 2 in downward direction so that the filter material 26 is compacted and gets into the filtering phase. The small particles of the substances 7 and 8 are filtered out, which is illustrated by the pollution 29 of the filter element 2. The substances 7 and 8 coalesce into large flocks and/or drops. The pure carrier medium leaves the device 3 through the grating 18, the outlet 20, the opened shut-off member 22 and the carrier medium outlet 5. FIG. 1 shows the shut-off members 21 and 16 in the closed state.

FIG. 2 shows the shut-off members 15, 16, 21 and 22 in exactly the reverse state, the filter element 1 then being in the filtering phase and the filter element 2 in the coalescing phase. For tapping off the substances 7 and 8 the shut-off members 27 and 28 respectively are opened.

FIG. 3 differs from FIG. 1 only in that the outlet of each filtering filter element 1, 2 can be connectled through shut-off members 30, 31 with the mixture feeder 4. The shut-off members 30, 31 are coupled through a control-rod 32, 33 with a shut-off member 34, 35 of the carrier medium outlet 5. Only during the first part of the filtering phase of the filter element 2 (FIG. 3) the shut-off member 31 is opened and the shut-off member 35 is closed so that the carrier medium does not flow out through the carrier medium outlet 5 and instead enters the mixture feeder 4. It is thus avoided that the mixture collected in the preceding coalescing phase in the filter element 2 below the grating 18 and in the filter material 26 and still being there at the instant of commutation should get into the carrier medium outlet 5.

Referring to FIG. 4, pure carrier medium is used at the end of the coalescent phase of the filter element 2 for flushing. For this purpose carrier medium is conducted by means of a pump 36 driven by a motor 37 from the carrier medium outlet 5 through an opened shut-off member 38 into the inlet 20 of the coalescing filter element 2, whilst the pump 12 with the motor 40 is standing still and the inlet 14 is closed by a shut-off member 41.

Simultaneous stopping of the motor 40, starting of the motor 37, closing of the shut-off member 41 and opening of the shut-off member 38 are performed by means of a common control-rod 42. Likewise a common control-rod 43 actuates simultaneously the shut-off members 39 and 44 together with the motors 40 and 37 in order to flush with carrier medium from the carrier medium outlet 5 during the last part of the coalescing phase of the filter element 1.

The device 3 of FIG. 5 is distinguished from that of FIG. 1 in that the filter elements 1 and 2 are arranged in a compact manner in a common housing 77 and their filter material consists of a packet of granular material, particularly sand, the grating 18 carrying a layer of coarse sand grains 45 of, for example, 1 to 2 mms subjacent to a layer of small grains 46 of, for example, 0.1 to 0.5 mm. The housing 77 is divided by a partition 48. The path indicated by the arrows 47, along which the mixture flows from the filter element 1 towards the filter element 2 has the shape of an S. The mixture is conducted along the collecting spaces 6 and 9 for light substances 7 and heavy substances 8. At the top the partition 48 leaves a narrow passage 49. A substance scanner 50 controls the shut-off member 27 for tapping off the substance 7 in due time.

Referring to FIG. 6, the commutation means such as the shut-off members 15, 16, 21 and 22 are not shown. The device 3 shown in FIG. 6 basically corresponds with that shown in FIG. 5, but in the reverse state, whilst the granular material of the filter elements 1 and 2 consists of large and small grains 45, 46 of a synthetic resin floating to the grating 18. Therefore, there is a downward flow in the coalescing phase and an upward flow in the filtering phase. The narrow passage 49 is provided on the lower side of the partition 48.

The device 3 shown in FIG. 7 basically corresponds with that of FIG. 5, said device 3 of FIG. 7 being, however, included in a large water purifying system 51 comprising a tank 52 with a mixture feeder 4 opening out therein. The mixture circulates in the direction of the arrows 53 so that the large particles of light substance 7 can segregate and rise into a collecting space 54. The mixture then passes through an inlet 13, which is released by a slide 55 and into the filter element 1, whilst the outlet 19 is cut off by said slide 55, which is actuated by a rod 56. The inlet 14 of the filter element 2 is cut off in FIG. 7 by a similar slide 57 actuated by a rod 58, whereas the outlet 20 is released. The opened outlet 19 or 20 communicates through an additional plate separator 59 with the carrier medium outlet 5. The collecting space 6 and the separator 59 communicate through narrow channels 60 and 61 respectively with the collecting space 54.

The device 3 shown in FIGS. 8 and 9 comprises a round housing 77 accommodating more than two, for example, four filter elements 1, 2, 74 and 75. In order to obtain alternating coalescing and filtering phases commutation means are provided, which consist of a central tube 63 connected with the mixture feeder 4 and adapted to be turned by control-means 62, said tube communicating with and being rigidly secured to a lower dish 64. This dish 64 can be set in four positions in which the dish forming an inlet of the filter element joins with lateral seal a grating 18 of one of the filter elements 1, 2, 74, 75. An inverted top dish 65 forming the outlet of the same filter element 1 and also being rigidly secured to the central tube 63 communicates through a downward conduit 11 passing the mixture along an S-shaped path 47 along a collecting space 6 for the light substance 7 and a collecting space 9 for the heavy substance 8 with a common space 66, which forms the inlets of the other three filter elements 2, 74 and 75 of FIGS. 8 and 9, which are in the filtering phase. Through these three filter elements 2, 74 and 75 the mixture substantially free of all substances arrives into a space 67 having a carrier medium outlet 5. The spaces 66 and 67 are separated not only by the filter elements 1, 2, 74 and 75 but also by a plate 68. This device 3 has the advantage that coalescing takes place with a three times higher flow velocity than filtering.

The device 3 shown in FIGS. 10 to 12 shows a slightly different construction embodying the invention. The commutation means are formed by three-way cocks 69 and 70. The mixture feeder 4 of FIG. 10 communicates through the three-way cock 70 with the inlet 14 of the filter element 2, said inlet 14 being formed by a tube 79 with a slot 80. The tube 79 constitutes in FIG. 10 the outlet of the filtering filter element 1, which communicates through the three-way cock 69 with the carrier medium outlet 5.

It should be noted that in the filter elements 1 and 2 of the device 3 embodying the invention gases occluded in the fluid can coalesce as well. The substance carried by the carrier medium may be gas, fluid and/or gas, the substances being preferably lighter or heavier than the carrier medium. Referring to FIG. 5 a conduit 81 blowing a gas, for example, compressed air is arranged beneath the filter elements 1 and 2 each having a shut-off member 71 and 72. In the coalescing phase a shut-off member 71 or 72 can be opened. This may be of particular importance in the event of a very sticky material and to enable an additional cleaning of the filter material only after a long time, for example, once a year. FIG. 6 shows that a heating helix 73 is provided for each grating 18.

For carrying out a particularly thorough cleaning of the filter elements 1, 2, 74 and 75, as shown in FIGS. 8 and 9, each filter element mainly formed by an independent sleeve 78 with a grating 18 secured thereto and having filter material 45 and 46 can be taken out of the housing 77, for example, for replacing the material, when the cover 76 is removed.

The device 3 according to the invention is particularly suitable for separating oil from water, but it also operates very satisfactorily in separating water from oil then forming the carrier medium.

Referring to FIGS. 13 to 20, each device 203 is equipped with a first filter element 201 and a second filter element 202, whilst a reservoir 207 is divided by a partition 208 into two separation chambers 209 and 210. The filter elements 201 and 202 communicate through passages 211 with the separation chambers 209 and 210 respectively. The mixture feeder 205 connected with a pump 212 can be alternately connected with inlets 213 and 214 of the filter elements 201 and 202 respectively, which are in the coalescing phase, through commutation means formed by shut-off members 215 and 216, which are actuated by a common control-rod 217. A carrier medium outlet 206 can be connected with outlets 219 and 220 of the filter elements 201 and 202 respectively in the filtering phase with the aid of commutation means formed by shut-off members 221 and 222 respectively, which are simultaneously actuated by the control-rod 217 by means of a toothed rack and pinion drive 223. The reservoir 207 has an impurity outlet 499 for the heavier impurities, provided with a shut-off member 228. The flow of the mixture across the device 3 is indicated by arrows.

Referring to FIG. 13, the mixture flow upwards through the filter element 201 in the coalescing phase, in which the granular filter material 224 being in a state of fluidity and intense motion offers an ample passage for the mixture together with the impurities 204 previously collected in said filter material 224. The medium laden with the impurities 204 flows through the passage 211 and the separation chambers 209 and 210 towards the second filter element 202. In the separation chambers 209 and 210 the impurities 204 previously filtered out in the filter element 201 in a filtering phase and carried along by the mixture during the coalescing phase readily segregate by gravity, the light impurities rising up into a collecting space 500 for the lighter substances 310.

Finer particles from the filter element 201 not separated out in the separation chambers 209 and 210 and fine impurities of the original mixture feed get into the second filter element 202, which is then in the filtering phase in which the stream of mixture passes downwards through the filter material 224, which is thus compacted. The impurities of the mixture precipitate in the filter material 224. The fine particles, for example, finely divided oil or the like, concentrate in the filter material and thus coalesce in the filter material 224. The purified carrier medium leaves the device 203 through the grating 225 supporting the filter material 224, the outlet 220, the opened shut-off member 222 and the carrier medium outlet 206.

The impurities 204 penetrate progressively into the filter meterial 224 and/or grow into a gradually thickening layer on the filter material 224 according as the filtering phase continues. On the basis of the higher pressure required to pass the medium through the filter element 202 and measured by a manometer 230 the degree of contamination of the filter element 202 can be assessed. The manometer 230 applies through an amplifier 231 its signal to a comparator 232, which compares the incoming signal with a value fixed in a memory 233. If the signal exceeds the set value in the memory 233, a signal can be applied, in the case of automatic control, to the toothed rack and pinion drive 223, which thus actuates the rod 217 and hence changes over the shut-off members 215, 216, 221 and 222, thus reversing the direction of flow of the medium through the device 203. Thus the filter element 201 gets into the filtering phase and the filter element 202 into the coalescing phase.

In some cases it may be interesting to leave the filter element 202 in the filtering phase for such a time that coalesced drops having such dimensions that they readily separate out in a simple separator are caught along by the carrier medium through the carrier medium outlet 206 and are separated in a follow-up purifier (not shown) from the carrier medium by gravitational segregation.

In order to tap off the heavy impurities 204 the shut-off member 228 is opened, whereas for tapping off the light impurities 310 shut-off members 229 are opened, as the case may be, in dependence upon level scanners 350.

The outlets of the filtering filter elements 201 and 202 can be connected through shut-off members 218 and 238 respectively with the mixture feeder 205. The shut-off members 218 and 238 are coupled by means of a control-rod 237 with shut-off members 235 and 236 of the carrier medium outlet 206. Only in the first part of the filtering phase of the filtering element 202 the shut-off member 235 is opened and the shut-off member 236 closed so that the medium contained in the filter material 224 and still contaminated with impurities 204 emanates via the carrier medium outlet 206, but is conducted back into the mixture feeder 205. In this way polluted medium present in the preceding flushing phase in the filter element 202 beneath the grating 225 and still present at the commutation instant is prevented from contaminating the puritied carrier medium. For this purpose a signal from the comparator 232 is applied to a clock mechanism 239, which applies a signal to an actuator 240 of the driving mechanism 501 of the control-rod 237.

Moreover, a signal is applied from the clock mechanism 239 to an actuator 245 of a three-way cock 244 for the supply of chemical reactants, which are mixed with the mixture, which may contain dissolved impurities, by means of a nozzle 243 arranged in the separation chamber 209 so that the dissolved impurities 204 are bound chemically as a collectable substance. At the change-over of the direction of flow across the device 203 the three-way cock 244 is also changed over so that the nozzle 242 supplies the reactants to the separation chamber 210.

Figure 15:
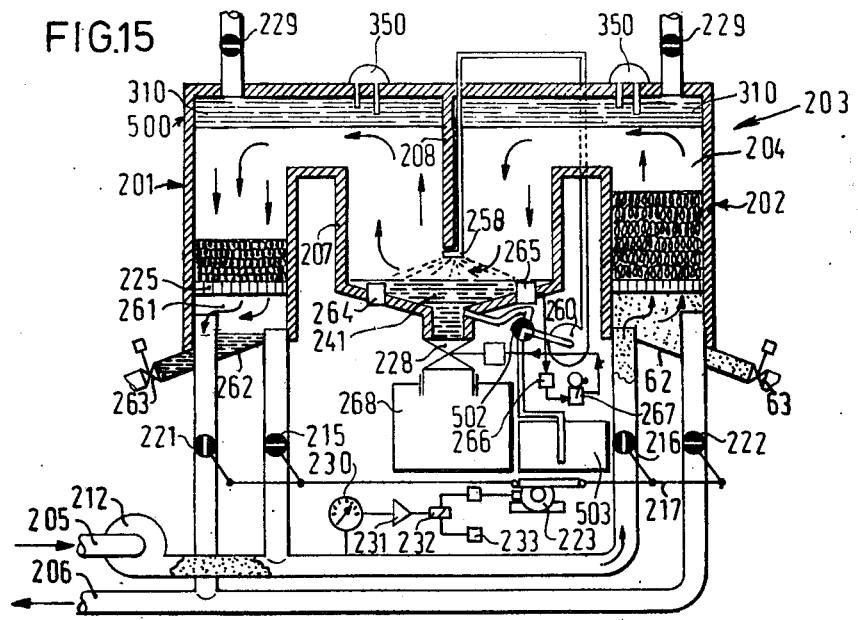

The device 203 shown in FIG. 15 differs from the device 203 of FIG. 13 in that on the lower side of the partition 208 a nozzle 258 introduces finely divided, heavy reactants into the stream, which track down heavy particles of impurities into a collection space 241 for heavy fluid. A signal source 264 in the collection space 241 co-operates with a signal receiver 265, which, in the event of excessive pollution of the heavy fluid in the collection space 241, actuates through a comparator 266 the signalling device 267, after which this heavy fluid can be conducted away through a shut-off member 228 into the collection vessel 268. Fresh reactants are then supplied through a changed-over three-way cock 502 from a stock vessel 503 via a pump 260 to the nozzle 258. When the collection space 241 contains a sufficient quantity of pure, heavy reactants, the three-way cock 502 is changed over, after which the pump 260 is fed from the collection space 241. As a matter of course, it is also possible to separate the impurities for example, by means of collision plates, laminations or electrically charged elements arranged in the reservoir 207.

The devices 203 shown in FIGS. 16 and 17 permit a chemical treatment, for example, by means of two ion exchangers 279 and 280 between the filter elements 201 and 202. Through the mixture feeder 205 and the open shut-off member 281 the mixture flows upwards through the filter material 282 located above the grating 225 of the filter element 201, which is in the filtering phase, the filter material 282 being chosen so that with the actual flow velocity the filtering material 282, for example, lead ore or the like will not exhibit fluidity. Impurities 204 settle on the lower side of the filter material 282.

Filter material, for example, polystyrene pellets which are statically charged by friction with a fluid could be advantageously used in this type of filter element, which is even capable of retaining impurities passing by in the fluidized state.

The medium free of impurities passes, when the shut-off member 284 is opened, through a conduit 283 and the ion exchangers 279 and 280 and through a conduit 285 with a shut-off member 286 it arrives at the filter element 202, which is in the flushing phase. The impurities 204 filtered out during the preceding filtering phase in the filter material 287 and located on the lower side of the filter material 287 are conducted away by the downward stream into the collection space 288 and then removed through a tap 292. The lighter substances 310 rise up into the collection space 500 arranged above the filter material 287. The purified medium leaves the device 203 through the opened shut-off member 290 and the carrier medium outlet 206. In order to revert the direction of flow the shut-off members 311 and 291 are opened and the shut-off members 281 and 290 are closed by means of the control-rod 217.

In order to regenerate the ion exchangers 279 and 289 the reaction space 207 is divided into four chambers 555, as is shown in FIG. 18,; two of them are always in operation, for example, by means of the shut-off members 284 and 286 and two of them are always out of operation, for example, by means of the shut-off members 293 and 294. The inoperative chambers can be regenerated in the meantime by means of regenerating fluid inlets 298 and 299.

The device 203 of FIG. 17 differs from that of FIG. 16 in that the reaction chambers 277 and 278 are always traversed in the same order independently of the direction of flow through the filter elements 201 and 202. For this purpose the conduits 283 and 285 have branch conduits 300 and 302, which can establish a communication between the filter elements 201 and 202 and each of the chambers 278 and 277. Additive shut-off members 301 and 303 controlled by a rod system 304 together with the shut-off members 284 and 286 ensure the correct direction of flow of the medium through the consecutive reaction chambers 277 and 278. Needless to say that instead of using ion exchangers other chemically or physically operating beds may be employed, for example, for washing the medium, or absorbing aromates or other organic compounds with chlorine, ozone or the like.

The devices 203 of FIGS. 19 and 20 differ from the devices described above in that as a filter material curled synthetic fibres 305, for example, trilene knit to horizontal gratings 307 in the filter elements 201 and 202 are used rather than granular material.

In the device 203 of FIG. 19 the filter elements 201 and 202 are traversed in upward direction by the medium in the flushing phase, so that the filter material 305 of curling, long wires flattens out and disengages impurities stored in the filter material 305. After disengagement of the impurities in the reservoir 207 the medium flows in the filtering phase downwards through the curling filter material 305.

Referring to FIG. 20, the mixture flows in the filtering phase upwards across the curling filter material 305 of the filter element 202, whilst the impurities are retained in the filter material. In the coalescing phase, which occupies only a comparatively small portion of the active period of the filter element the medium flows for the coalescence of its impurities towards the filter element 201, in which the moving filter material 305 is flushed and the impurities are disposed off in a collection space 314 having a tap 315. In this coalescing phase the shut-off member 318 is closed. In the filtering phase the shut-off member 318 is opened, whilst simultaneously the shut-off members 219 are closed.

Figure 14:
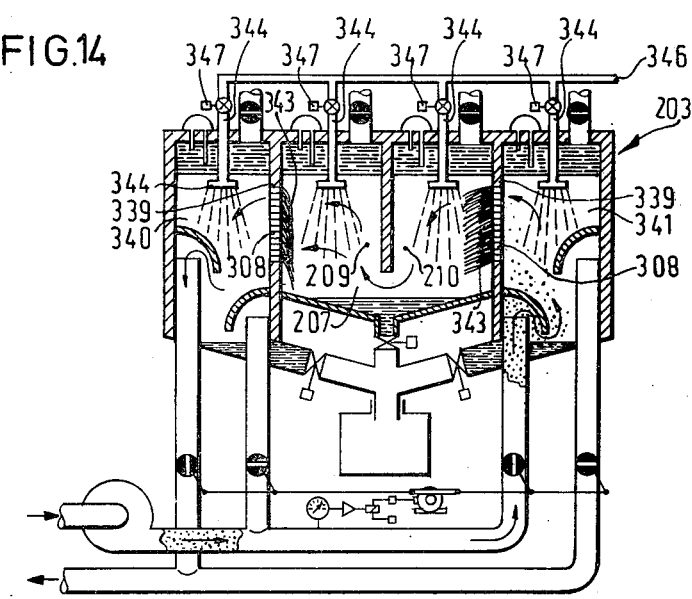

FIG. 14 shows as a filter material long, flat strips 343 of, for example, polyvinylchloride, shown in the filtering state and suspended to vertical gratings 308 and the same strips in the stretched state in the coalescing phase. In order to prevent excessive closure of the grating 308 the strips 343 have unequal lengths. The filter gratings 308 are included in the direction of flow indicated in the partition 339 between a post-purifier 340 and a pre-purifier 341 respectively and the chambers 209 and 210 respectively of the reservoir 207. Spraying conduit 346 is provided with spraying nozzles 344 including regulator valves 347 disposed in the post- and pre-purifier 340 and 341 and the chambers 209 and 210 respectively for the supply of chemicals capable of binding the liquid impurities contained in the medium into particles that can be captured in the filter media.

Needless to say that the varying details of the various embodiments may also be employed in the other embodiments.

The device 203 according to the invention shown in FIGS. 21 and 22 comprises three filter elements 530 communicating on the one hand with a mixture feeder 205 through a shut-off member 215 and on the other hand through a shut-off member 318 with a water outlet 206. All filter elements 530 communicate through a shut-off member 541 with a reservoir 207. When the filter material 224 of a filter element 530 is excessively polluted, it is cleaned in a next coalescing phase. For this purpose the associated shut-off members 234 and 276 are closed, whereas the same shut-off members associated with the other filter elements 530 are set in the other state (see FIG. 22). The supply pressure and the supply velocity produced by the pump 295 in the mixture feeder 205 are such that the filter material 224 gets into fluidity and into intense motion. In the coalescing phase (the lower filter element 503 in FIG. 22) the water polluted, for example, by oil passes through the filter elements 530 and through the filter material 224 built on the grating 225, in which the fine oil droplets coalesce into larger drops. The larger drops rise into the collection space 500 above the filter element 530, whereas the carrier medium with small particles flows through an opened shut-off member 541 towards the reservoir 207. The remainder passes with the stream towards the reservoir 207, the dimensions of which are so large that heavy impurities can sink down towards the collection space 512 having a tap 562. The light impurities rise up into the collection space 513 having a shut-off member 529. In order to restrict the dimensions of the collection space 207 centrifugal apparatus or the like, for example, the hydrocyclone 289 shown herein can improve the separation of impurities separable only with difficulty by subjecting them to centrifugal force. The water mainly free of impurities but still slightly contaminated is supplied through a pressing pump 246 and shut-off members 215 to two filter elements 530 being in a filtering phase, from where the purified fluid arrives at the carrier medium outlet 206. The water which may still be polluted by oil drops flows through the outlet 206 towards a post-purifier 561, in which the oil is separated from the water and the clean water is conducted away through a tap 563.

By adapting the filtering phase and the flushing phase in the filter elements 530 to the number of filter elements 530 to be provided, which are alternately brought into the filtering phase and the flushing phase, a continuously operating fluid purifier is obtained.

The invention may be applied not only to separating substances from a carrier medium but also to the separation of substances from a gas, for example, soot and air. To this end the devices 3 and 203 described above may be employed, if necessary subsequent to an adaptation to the use of a gas. FIGS. 23 and 24 show a device 403, which mainly corresponds with the device 203 of FIG. 15, but is intended to purity a gas.

The device 403 shown in FIGS. 23 and 24 for separating, for example, granular or fibrous dust particles 404 from the air comprises two filters 401 and 402, a gas feeder 405 for the polluted gas, a gas outlet for the purified gas and a collection space 407 for the impurities 404, said collection space 407 being separated into two chambers 409 and 410 by a partition 408. One filter 401 and the other filter 402 communicate with the chambers 409 and 410 respectively through conduits 411. The gas feeder 405 provided with a pump 412 can be alternately connected with the inlets 413 and 414 of the coalescing filters 401 and 402 respectively through commutable connecting means formed by shut-off members 415 and 416, which are actuated by a common control-rod 417. The gas outlet 406 can be connected with the filter outlets 419 and 420 of the filtering filters 401 and 402 respectively by means of commutable connecting members consisting of shut-off members 421 and 422 respectively, which are also actuated simultaneously by the control-rod 417 by way of a toothed rack and pinion drive 423.

The filters 401 and 402 comprise each a filter space 424 and a grid 425. In the coalescing phase the fluidized, vigorously moving filter material 426 occupies a large part of the filter space 424, whereas in the filtering phase the filter material 427, which may consist of grains, loose fibres or the like, in its compact state occupies a small part of the filter space 424. The collection space 407 has an impurity outlet closed by a shut-off member 428.

The flow of the polluted gases is indicated in FIGS. 23 and 24 by arrows and the reversal of the direction of flow is achieved by means of the control-rod 417.

Referring to FIG. 23, the mixture flows via the pump 412 upwards through the filter material 426, which is thus loosened and offers ample passage for the gas together with the impurities 404 picked up from the filter material 426. The gas flow may have a velocity of about 10ft/sec. One filter 401 is then in the coalescing phase. The gas laden with impurities 404 flows through a conduit 411 and the chamber 409 or 410 respectively of the collecting space 407 towards the second filter 402. In the collecting space 407 the impurities 404 compacted in the filter 401 and carried along by the gas readily separate out and can be captured, preferably in a water bath 431 or the like.

The light particles, for example, fly ash particles contained in the stream of gas are passed on and arrive at the other filter 402. This filter 402 is then in the filtering phase, in which the gas flows downwards through the filter material 427, which is thus compacted. The small dust particles 404 precipitate as pollutants 429 of the filter material 427.

The fine droplets carried along by the gas and often adhering to fine dust particles will coalesce in the filter material 427. The purified gas leaves the gas scrubber 403 through the grating 425, the outlet 420, the opened shut-off member 422 and the gas outlet 406. FIG. 23 shows the shut-off members 421 and 416 in the close state. In the filtering phase impurities 404 are collected in the filter material 427. These impurities 404 penetrate gradually further into the filter material 427 according as the filtering phase continues longer and/or a gradually thicker layer is formed on top of the filter material 427. The degree of pollution of this filter 402 may be assessed by means of a manometer 430 measuring the higher pressure required for passing the gas through the filter 402. The manometer 430 applies its signal through an amplifier 455 to a comparator 432, which compares the incoming signal with a signal fixed in a memort 463. If the signal exceeds that of the memory 463, a voltage is applied to the motor of the toothed rack and pinion mechanism 423, which then actuates the rod 417 and the shut-off members and thus reverts the direction of flow of the gas scrubber 403. Thus the gas scrubber 403 gets into the position shown in FIG. 24. The positions of the shut-off members 415, 416, 421 and 422 are exactly inverted, one filter 401 being then in the filtering phase and the other filter 402 in the coalescing phase. For tapping off the impurities 404 the shut-off member 428 is opened so that the impurities 404 collected in the space 407, as the case may be, in a water bath 431, can leave the gas scrubber 403. In the embodiment of FIG. 24 the impurity outlet 451 of the collection space 407 communicates with a bag 454 for collecting the dry impurities 404 collected in the chambers 409 and 410, said impurities readily leaving the gas scrubber 403 owing to the pressure difference inside the gas scrubber 403 and of the ambience thereof through the shut-off member 428.

Figure 25:
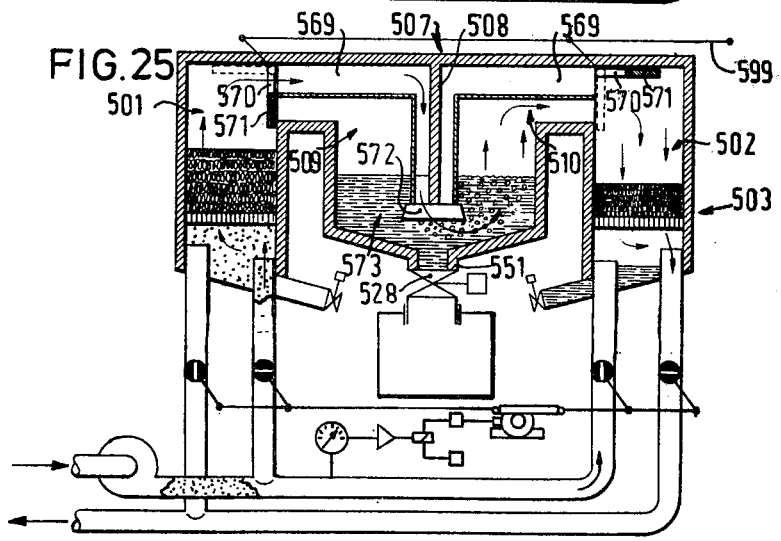

In the gas scrubber 503 of FIG. 25 the collecting space 507 is designed to accommodate on the lower side in the chambers 509 and 510 a fluid bath 573, in which a gas carried by the gas, for example, fluorine can be chemically bound, for example, by NaOH. For this purpose an additive conduit 569 including an inlet plate 571 with an opening 570 communicates with the filters 501 and 502. Each conduit 569 is provided at its lower end located beneath the partition plate 508 below the level of the fluid bed 573 with a nozzle 572. In order to switch on the conduit 569 concerned in accordance with the direction of gas flow a control-rod 599 changes over the associated inlet plate 571 from the rest position (see filter 502) to the working position (see filter 501) or conversely.

Figure 26:
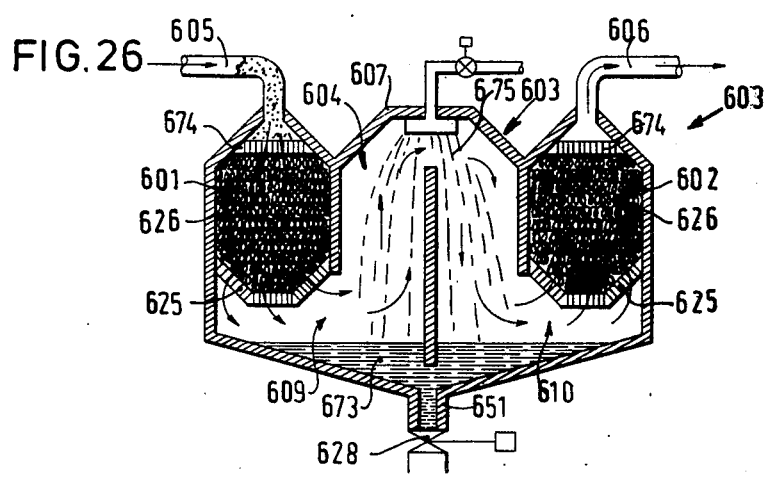

The gas scrubber 603 shown in FIG. 26 differs from that of FIG. 25 by the use of very light weight filter material 626, for example, expanded polystyrene. This material is enclosed between a depression 625 and an upper grating 674. In the coalescing phase of filter 601 the stream of gas passes through this filter material 626 in downward direction so that the cohesion is interrupted and the captured impurities 604 are conducted away, sprayed with fluid 675 and captured in the fluid bath 673. As an alternative, it is, of course, possible to capture the dry impurities 604, for example, by means of collision plates, laminations or statically charged elements in the collection space 607. The filter 602 traversed in the upward direction is then in the filtering phase.

What we claim is:

1. A method of separating a mixture of a carrier medium and at least one substance insoluble therein, for example, water and oil or gas and soot, in which a stream of mixture for being filtered is passing through a packet of compact filter material, after which the substance retained in the filter material is removed therefrom by passing the mixture through said packet of filter material, so that this filter material is brought into a moving state, said mixture together with the substance removed from the filter material being conducted along a collecting space and across a compact packet of filter material, characterized in that a stream of mixture to be separated is dissociated in three steps i.e. a first step in which the stream of mixture is passed for coalescence or coagulation of the substance through a packet of moving filter material, a second step in which the stream of mixture is passed along the collecting space and the substance coalesced or coagulated in the first step segregates from the mixture by gravity, and a third step in which the stream of mixture treated in the preceding steps is passed through a further packet of compact filter material filtering out substantially the remainder of the substances, said packets of filtering material being alternately used for treating the stream of mixture in the first and the third steps.

2. A method as claimed in claim 1, characterized in that during the first step the stream of mixture passes upwards through the moving filter material and during the third step the mixture passes downwards through the packet of compact filter material.

3. A method as claimed in claim 1, characterized in that at the end of the first step carrier medium mainly treated in a first, second and third step is passed through the filter material rather than the mixture.

4. A method as claimed in claim 1, characterized in that two packets of filter material are alternately traversed in the first and third steps by the mixture in opposite senses and in that when a packet of filter material is initially traversed in the third step, the mixture located downstream of this packet of filter material is again treated in a first, second and third step.

5. A method as claimed in claim 1, characterized in that during the second step substances furthering the separation are added into the collecting space.

6. A method as claimed in claim 1, characterized in that reactants capable of chemically binding the dissolved impurities into a collectable substance are added to the mixture.

7. A method as claimed in claim 1, characterized in that during the second step the mixture is passed through an ion exchanger and/or through a bed absorbing the impurities.

8. A method as claimed in claim 1, characterized in that fine impurity particles of a gaseous carrier medium emanating from a packet of moving filter material are wetted and during the third step the wetted particles are filtered out in the compact filter material.

9. A device for separating a mixture comprising at least one first filter element having a packet of filter material, a mixture feeder, a carrier medium outlet and at least one collecting space for the substance, characterized in that the first and the second filter elements communicate with one another through a conduit passing along the collecting space, in that the mixture feeder can be alternately connected through commutating means with the inlet of the first and with that of the second filter element treating the stream of mixture in a first step with moving filter material and in that the carrier medium outlet can be alternately connected through commutatable connecting means with the outlet of the first and with that of the second filter element treating the stream of mixture in the third step with compacted filter material.

10. A device as claimed in claim 9, characterized in that each filter element mainly consists of a packet of a synthetic resin repelling grains of the substance.

11. A device as claimed in claim 10, characterized in that the packet of granular material, for example, sand consists of grains having a size of 0.1 to 0.5 mm and a size of 1 to 2 mms respectively.

12. A device as claimed in claim 9, characterized in that the filter material consists of heavy grains, for example, iron ore, lead ore or baryte.

13. A device as claimed in claim 9, characterized in that the filter material is formed by long, flexible elements fastened to a grating and preferably having unequal lengthes.

14. A device as claimed in claim 13, characterized in that the flexible elements consist of curling wire material as a filter medium.

15. A device as claimed in claim 13, characterized in that the flexible elements are formed by flat strips of unequal lengths.

16. A device as claimed in claim 13, characterized in that the flexible elements are disposed in the filter element by suspending them to a hanging or lying grating.

17. A device as claimed in claim 9, characterized in that the mixture feeder can be alternately connected through the commutatable connecting means with the inlets of a small number for example, one, of a filter element coalescing the stream of mixture in a first step, whilst the carrier medium outlet can be alternately connected through commutatable connecting means with the outlets of a plurality of filter elements filtering the stream of mixture in a third step.

18. A device as claimed in claim 9, characterized in that the commutation means respond to the flow resistance of the filter element in the filtering phase and/or to a timer.

19. A device as claimed in claim 9, characterized in that signalling means indicate the degree of pollution of a bath provided in the collecting space and to be traversed by the stream of gas.

20. A device as claimed in claim 9, characterized in that it is designed as a gas scrubber and comprises wetting means for wetting the impurities emanating from the filter being in the flushing phase.

21. The method of separating a mixture of a carrier medium and at least one substance which is insoluble therein, which comprises the steps of:
(a) flowing the mixture through a first bed of filter material at such a rate as to expand said bed and flush foreign material therefrom while at the same time causing said substance to coalesce or coagulate, and discharging the mixture with coalesced substance into a collecting region;
(b) segregating said coalesced substance by gravity in said collecting region;
(c) flowing predominantly said carrier medium from said collecting region through a second bed of filter material at said rate whereby to compact said second bed and cause residual substance from said collecting region to be trapped therein while passing said carrier medium therethrough; and
(d) reversing the flow of said mixture in steps (a) and (c) while continuing the segregation of step (b) whereby said second bed is expanded to pass said mixture while coalescing said substance and said first bed is compacted to trap residual substance from said collecting region therein.

22. The method of separating a fluid carrier medium from a substance which is insoluble but mixed therein, which comprises the steps of:
(a) flowing the mixture of carrier medium and insoluble substance through a flow path alternately in opposite directions;
(b) maintaining first and second expandible/contractible filter beds in spaced apart relation in said flow path to define a collecting region therebetween, said first bed being maintained to expand as a result of one direction of mixture flow and to contract as a result of the opposite direction of mixture flow and said second bed being maintained to contract as a result of said one direction of mixture flow and to expand as a result of said opposite direction of flow whereby one filter bed expands to pass said mixture while causing coalescing of said insoluble substance while the other filter compacts to pass said carrier medium while causing entrapment of said substance, and vice versa dependent upon the direction of flow; and
(c) collecting said insoluble substance in said collecting region whereby the carrier medium reaching that bed which is compacted is in substance-depleted state.

23. Apparatus for separating a fluid carrier medium from a substance which is insoluble therein and mixed therewith which comprises:
means defining a flow path and including inlet means at each end of the flow path and outlet means at each end of the flow path;
means for introducing the mixture to said inlet means and means for educting carrier medium depleted of said substance from said outlet means, and valve means for connecting said means for introducing to that one of said inlet means at one end of said flow path while connecting said means for educting to that one of said outlet means at the opposite end of said flow path and vice versa whereby said mixture is caused to flow alternately in opposite directions through said flow path;
first filter bed means in said flow path for expanding to pass said mixture while coalescing said substance in response to mixture flow in one direction through said flow path and for contracting to pass said carrier while trapping said substance medium in response to mixture flow in the opposite direction;
second filter bed means in said flow path for contracting to pass said carrier while trapping said substance in response to mixture flow in said one direction and for expanding to pass said medium while coalescing said substance in response to mixture flow in said other direction;
said first and second filter bed means being spaced apart within said flow path to define a collecting space therebetween, and means for removing said substance from said collecting space.

* * * * *